US011573212B2

(12) United States Patent
Inoue (10) Patent No.: US 11,573,212 B2
(45) Date of Patent: Feb. 7, 2023

(54) FLOW CHANNEL MECHANISM AND LIQUID CHROMATOGRAPH INCLUDING THE SAME (71) Applicant: Shimadzu Corporation, Kyoto (JP)

(72) Inventor: Takashi Inoue, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 413 days.

(21) Appl. No.: 16/010,966

(22) Filed: Jun. 18, 2018

(65) Prior Publication Data
US 2019/0383777 A1  Dec. 19, 2019

(51) Int. Cl.
G01N 30/46 (2006.01)
G01N 30/34 (2006.01)
G01N 30/02 (2006.01)
G01N 30/20 (2006.01)
G01N 30/30 (2006.01)
G01N 30/32 (2006.01)

(52) U.S. Cl.
CPC ........... *G01N 30/468* (2013.01); *G01N 30/30* (2013.01); *G01N 30/32* (2013.01); *G01N 30/34* (2013.01); *G01N 2030/027* (2013.01); *G01N 2030/202* (2013.01); *G01N 2030/3084* (2013.01); *G01N 2030/326* (2013.01); *G01N 2030/328* (2013.01); *G01N 2030/347* (2013.01)

(58) Field of Classification Search
None
See application file for complete search history.

(56) References Cited

U.S. PATENT DOCUMENTS

| 7,132,650 | B1 * | 11/2006 | Gamble | ............. G01N 30/7233 250/288 |
| 7,674,375 | B2 * | 3/2010 | Gerhardt | ................ G01N 30/32 210/198.2 |
| 2004/0035793 | A1 * | 2/2004 | Legendre, Jr. | ... C12Q 2527/107 210/656 |

(Continued)

FOREIGN PATENT DOCUMENTS

| JP | 2001-074721 A | 3/2001 |
| JP | 5012148 B | 6/2012 |
| WO | 2004/083847 A1 | 9/2004 |

OTHER PUBLICATIONS

Japanese Office Action dated Jan. 8, 2019, in connection with corresponding JP Application No. 2015-250536 (6 pgs., including English translation).

*Primary Examiner* — Kara M Peo
(74) *Attorney, Agent, or Firm* — Maier & Maier, PLLC (57) ABSTRACT

A first mixer mixes solvents therein. A second mixer has a capacity different from that of the first mixer, and mixes solvents therein. A first separation column is associated with the first mixer. A second separation column is associated with the second mixer. A first valve enables switchover between a first communication state in which the first mixer and the first separation column communicate with a detector, and a second communication state in which the second mixer and the second separation column communicate with the detector. Only by switching the first valve, it is possible to switch between the first communication state and the second communication state. The internal capacity of a flow channel in the first communication state differs from that in the second communication state. Therefore, it is easy to perform analysis with different internal capacities.

7 Claims, 4 Drawing Sheets

(56) References Cited

U.S. PATENT DOCUMENTS

| | | | |
|---|---|---|---|
| 2004/0178133 A1* | 9/2004 | Deguchi | G01N 30/20 210/198.2 |
| 2008/0053908 A1* | 3/2008 | Chordia | B01D 15/165 210/656 |
| 2008/0245715 A1 | 10/2008 | Iwata | |
| 2013/0295597 A1* | 11/2013 | DeWitte | G01N 35/08 435/23 |

* cited by examiner

FLOW CHANNEL MECHANISM AND LIQUID CHROMATOGRAPH INCLUDING THE SAME

BACKGROUND OF THE INVENTION

Field

The present invention relates to a flow channel mechanism for separating sample components in a solvent and enabling a detector to detect the sample components, and a liquid chromatograph including the same.

Description of the Related Art

In a liquid chromatograph, analysis may be performed by mixing a plurality of kinds of solvents with a mixer, and separating sample components in the solvents in a separation column while the mixed solvents are delivered as a mobile phase to the separation column. In such analysis, the solvent may be delivered at different flow rates, such as a flow rate (conventional flow rate) of about 50 µL/min to 1 mL/min and a flow rate (micro flow rate) of 50 µL/min or less. Usually, a liquid chromatograph of this kind includes one mixer.

JP-B-5012148 discloses a liquid chromatograph including a conventional mixer used when a solvent is delivered at a conventional flow rate and a micro mixer used when a solvent is delivered at a micro flow rate. In this example, during an ordinary analysis, a solvent is delivered at the conventional flow rate by using the conventional mixer, and during a high-concentration analysis, a solvent is delivered at the micro flow rate by using the micro mixer. That is, JP-B-5012148 discloses a configuration of selectively using a plurality of kinds of mixers having different capacities.

SUMMARY

However, with the conventional configuration as described above, in a case of replacing a separation column according to analysis conditions, an operator has to manually remove the separation column and attach another separation column. Therefore, it is necessary to perform an operation for replacing the separation column in addition to an operation of switching between the plurality of kinds of mixers. As a result, an operation for performing analysis with different internal capacities is complicated.

The present invention has been made in view of the above circumstances, and an object of the present invention is to provide a flow channel mechanism which facilitates an operation for performing analysis with different internal capacities and a liquid chromatograph including the same.

A flow channel mechanism according to the present invention is configured to separate sample components in a solvent and enable a detector to detect the sample components. The flow channel mechanism includes a first mixer, a second mixer, a first separation column, a second separation column, and a flow-channel switching unit. The first mixer mixes solvents therein. The second mixer has a capacity different from that of the first mixer, and mixes solvents therein. The first separation column is associated with the first mixer. The second separation column is associated with the second mixer. The flow-channel switching unit enables switchover between a first communication state in which the first mixer and the first separation column communicate with the detector, and a second communication state in which the second mixer and the second separation column communicate with the detector.

According to such a configuration, the flow-channel switching unit enables easy switchover between the first communication state in which the first mixer and the first separation column communicate with the detector and the second communication state in which the second mixer and the second separation column communicate with the detector. As described, only by switching the flow-channel switching unit, it is possible to easily switch between the first communication state and the second communication state. The internal capacity of a flow channel in the first communication state differs from that in the second communication state. Therefore, it is easy to perform analysis with different internal capacities.

The flow channel mechanism may further include a column oven. The column oven houses the first mixer, the second mixer, the first separation column, and the second separation column. The inside of the column oven is heated.

According to such a configuration, all of the first mixer, the second mixer, the first separation column, and the second separation column are housed in the column oven. Therefore, since an operation for replacing the mixers and an operation for replacing the separation columns can be simultaneously performed, the operation is further facilitated.

The flow-channel switching unit may be configured of one valve.

According to the above configuration, only by switching the one valve, it is possible to easily switch between the first communication state and the second communication state. The internal capacity of the flow channel in the first communication state differs from that in the second communication state. As a result, unlike the case of switching a plurality of valves, it is not necessary to synchronize switching timings, which further facilitates the operation.

The flow channel mechanism may further include a concentrator column which captures and concentrates a sample. In this case, in the first communication state, a sample concentrated in the concentrator column may be introduced into the first separation column, and in the second communication state, the sample concentrated in the concentrator column may be introduced into the second separation column.

According to the above configuration, it is possible to introduce the sample captured and concentrated in the concentrator column selectively to the first separation column or the second separation column only by switching the flow-channel switching unit. The concentrated sample is introduced into the first separation column or the second separation column by easily switching to the first communication state or the second communication state. The internal capacity of the flow channel in the first communication state differs from that in the second communication state. Therefore, analysis can be performed satisfactorily by using one of the separation columns.

A liquid chromatograph according to the present invention includes the flow channel mechanism and a detector. The detector detects sample components in solvents having been separated in the first separation column in the first communication state, or sample components in solvents having been separated in the second separation column in the second communication state.

According to the present invention, only by switching the flow-channel switching unit, it is possible to easily switch between the first communication state and the second communication state. The internal capacity of the flow channel in the first communication state differs from that in the second communication state. Therefore, it is easy to perform analysis with different internal capacities.

DETAILED DESCRIPTION

Figure 1:
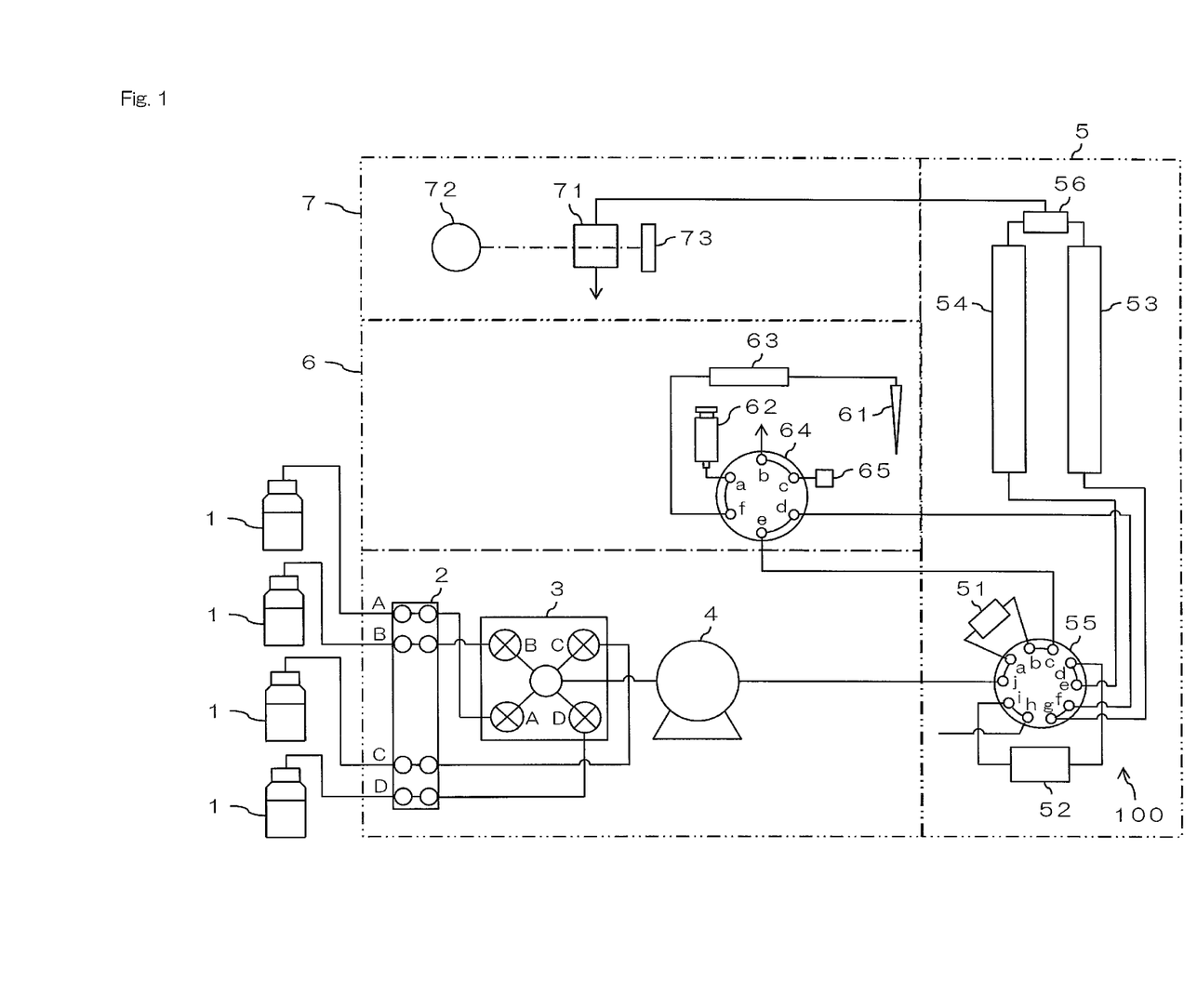
FIG. 1 is a flow channel diagram illustrating a configuration example of a liquid chromatograph according to one embodiment of the present invention.

FIG. 1 is a flow channel diagram illustrating a configuration example of a liquid chromatograph according to one embodiment of the present invention. The liquid chromatograph includes a plurality of containers 1, a degassing unit 2, a low-pressure gradient unit 3, a liquid feed pump 4, a column oven 5, an autosampler 6, a detector 7, and the like. The liquid chromatograph can perform low-pressure gradient analysis.

Different kinds of solvents are contained in the plurality of containers 1, respectively. These solvents are delivered from the respective containers 1 as a mobile phase by driving the liquid feed pump 4. The plurality of kinds of solvents delivered from the respective containers 1 is degassed while passing through the degassing unit 2 and then merges in a constant ratio in the low-pressure gradient unit 3. The mixing ratio of the respective solvents can be adjusted in the low-pressure gradient unit 3.

The column oven 5 is defined by a hollow casing (not illustrated), and houses therein a first mixer 51, a second mixer 52, a first separation column 53, a second separation column 54, a first valve 55, and the like. Each of the first mixer 51, the second mixer 52, the first separation column 53, and the second separation column 54 is connected to the first valve 55 via a pipe. A heater (not illustrated) is disposed in the column oven 5, and the inside of the column oven 5 is heated by the heater.

The plurality of kinds of solvents merged in the low-pressure gradient unit 3 is introduced into the column oven 5 via the liquid feed pump 4, and flows into either the first mixer 51 or the second mixer 52. In the state illustrated in FIG. 1, the plurality of kinds of solvents flows into the first mixer 51. However, if the first valve 55 is rotated, the plurality of kinds of solvents can flow into the second mixer 52.

The autosampler 6 includes a needle 61, a syringe 62, a concentrator column 63, a second valve 64, and the like. The needle 61 is inserted into a sample container (not illustrated) and sucks a sample from the sample container. The syringe 62 is driven when the sample is sucked through the needle 61.

The concentrator column 63 is a so-called sample loop, and communicates with the needle 61. In the state illustrated in FIG. 1, the needle 61 communicates with the syringe 62 via the concentrator column 63. In a case where the syringe 62 is driven in this state to suck the sample through the needle 61, the sucked sample is captured in the concentrator column 63 and is concentrated in the concentrator column 63. Then, if the needle 61 is inserted into the sample introduction unit 65 communicating with the second valve 64 and the second valve 64 is rotated, the plurality of kinds of solvents mixed in the first mixer 51 or the second mixer 52 passes through the concentrator column 63. As a result, the sample is introduced into the plurality of kinds of mixed solvents, and the sample is introduced into the first separation column 53 or the second separation column 54 in the column oven 5.

The second valve 64 is, for example, a six-port valve having six ports a to f. The port a of the second valve 64 communicates with the syringe 62 via a pipe. The port f communicates with the needle 61 via pipes and the concentrator column 63. The port c of the second valve 64 communicates with the sample introduction unit 65 via a pipe. The ports d and e of the second valve 64 communicate with the first valve 55 in the column oven 5 via pipes. The port b of the second valve 64 communicates with a drain (not illustrated).

The first valve 55 is, for example, a ten-port valve having ten ports a to j. The ports a and b of the first valve 55 communicate with an inlet and outlet of the first mixer 51 via pipes, respectively. The ports i and d of the first valve 55 communicate with an inlet and outlet of the second mixer 52 via pipes, respectively. The port g of the first valve 55 communicates with the upstream end of the first separation column 53 via a pipe. The port e of the first valve 55 communicates with the upstream end of the second separation column 54 via a pipe. The ports c and f of the first valve 55 communicate with the second valve 64 of the autosampler 6 via pipes. The port j of the first valve 55 communicates with the liquid feed pump 4 via a pipe. A pipe is connected to the port h of the first valve 55, and the front end of the pipe is closed by a stop joint (not illustrated).

The first mixer 51 is a gradient mixer having a relatively small capacity. Specifically, the capacity of the first mixer 51 is less than 100 μL (for example, 40 μL). A flow channel formed in the first mixer 51 repeatedly branches off and merges. Thus, the plurality of kinds of inflowing solvents is mixed. The first separation column 53 is associated with the first mixer 51.

The second mixer 52 is a gradient mixer having a relatively large capacity and has a capacity different from that of the first mixer 51. Specifically, the capacity of the second mixer 52 is equal to or greater than 100 μL (for example, 750 μL). A flow channel formed in the second mixer 52 repeatedly branches off and merges. Thus, the plurality of kinds of inflowing solvents is mixed. The second separation column 54 is associated with the second mixer 52.

The first separation column 53 and the second separation column 54 merge at the downstream side via a manifold 56. The manifold 56 is connected to the detector 7 via a pipe. The detector 7 includes a cell 71, a light source 72, and a light receiver 73. The sample which has passed through the first separation column 53 or the second separation column 54 is introduced into the cell 71 of the detector 7. The cell 71 is irradiated with measuring light from the light source 72. The light receiver 73 receives the measurement light which has passed through the cell 71. A wavelength specific to the sample in the cell 71 of the measuring light passing through the cell 71 is absorbed. Thus, the sample can be identified according to the received light intensity of the measuring light in the light receiver 73.

In the state illustrated in FIG. 1, the ports a and j of the first valve 55 communicate with each other, and the ports b and c communicate with each other. Therefore, the plurality of kinds of solvents flowing into the port j of the first valve 55 from the liquid feed pump 4 is mixed in the first mixer 51 and then flows into the port e of the second valve 64. In the second valve 64, the ports d and e communicate with each other. Therefore, the plurality of kinds of solvents mixed in the first mixer 51 passes through the second valve 64 without flowing into the concentrator column 63, and flows into the port f of the first valve 55.

In the first valve 55, the ports f and g communicate with each other. Therefore, the plurality of kinds of mixed solvents is introduced into the first separation column 53. After passing through the first separation column 53, the plurality of kinds of mixed solvents flows into the cell 71 of the detector 7. As described, in the state illustrated in FIG. 1, the plurality of kinds of solvents mixed in the first mixer 51 is introduced into the first separation column 53 without the sample being introduced into the solvents.

In the state illustrated in FIG. 1, the ports a and f in the second valve 64 communicate with each other. Therefore, by driving the syringe 62 in this state and sucking the sample through the needle 61, it is possible to capture and concentrate the sample in the concentrator column 63. When the sample is analyzed by using the first mixer 51 and the first separation column 53, after the sample is captured in the concentrator column 63 in this manner, the needle 61 is inserted into the sample introduction unit 65 and the second valve 64 is rotated.

Figure 2:
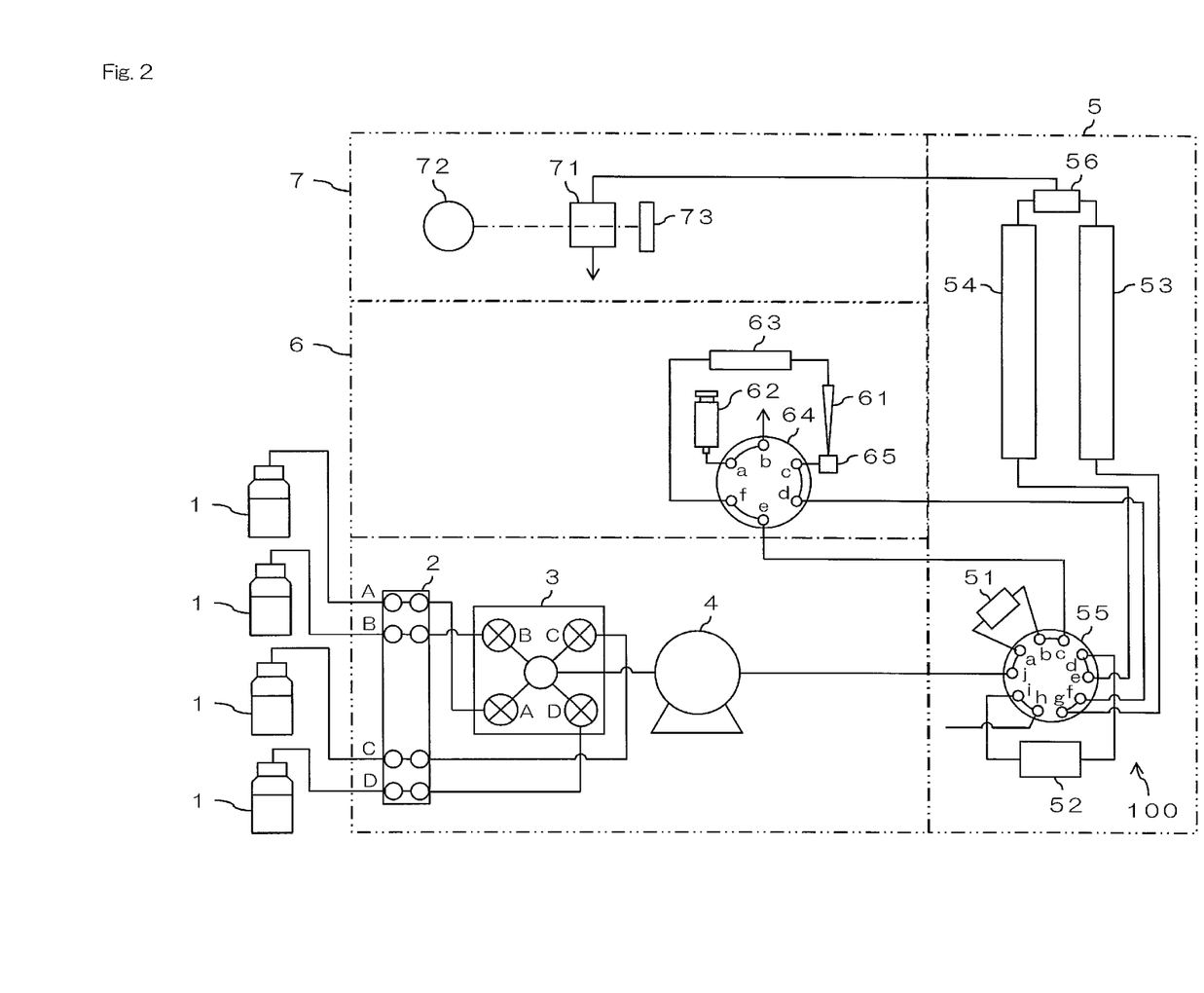
FIG. 2 is a flow channel diagram illustrating a state in which a second valve is rotated from the state in FIG. 1.

FIG. 2 is a flow channel diagram illustrating a state in which the second valve 64 is rotated from the state illustrated in FIG. 1. In the state illustrated in FIG. 2, the ports c and d communicate with each other and the ports e and f communicate with each other in the second valve 64. Therefore, unlike the case illustrated in FIG. 1, the plurality of kinds of solvents mixed in the first mixer 51 is not directly introduced into the first separation column 53 but passes through the concentrator column 63. After the concentrated sample is introduced into the concentrator column 63, the plurality of kinds of solvents is introduced into the first separation column 53.

Each sample component of the sample introduced into the first separation column 53 in this manner is separated while the sample passes through the first separation column 53. Then, each sample component is introduced into the cell 71 of the detector 7. Then, the light receiver 73 receives measuring light from the light source 72 that has passed through the cell 71. Thus, the peak of each separated sample component is detected according to the received light intensity. As described, the plurality of kinds of solvents mixed in the first mixer 51 is used as a mobile phase and the first separation column 53 is used to analyze the sample. Therefore, high-speed analysis can be performed.

Figure 3:
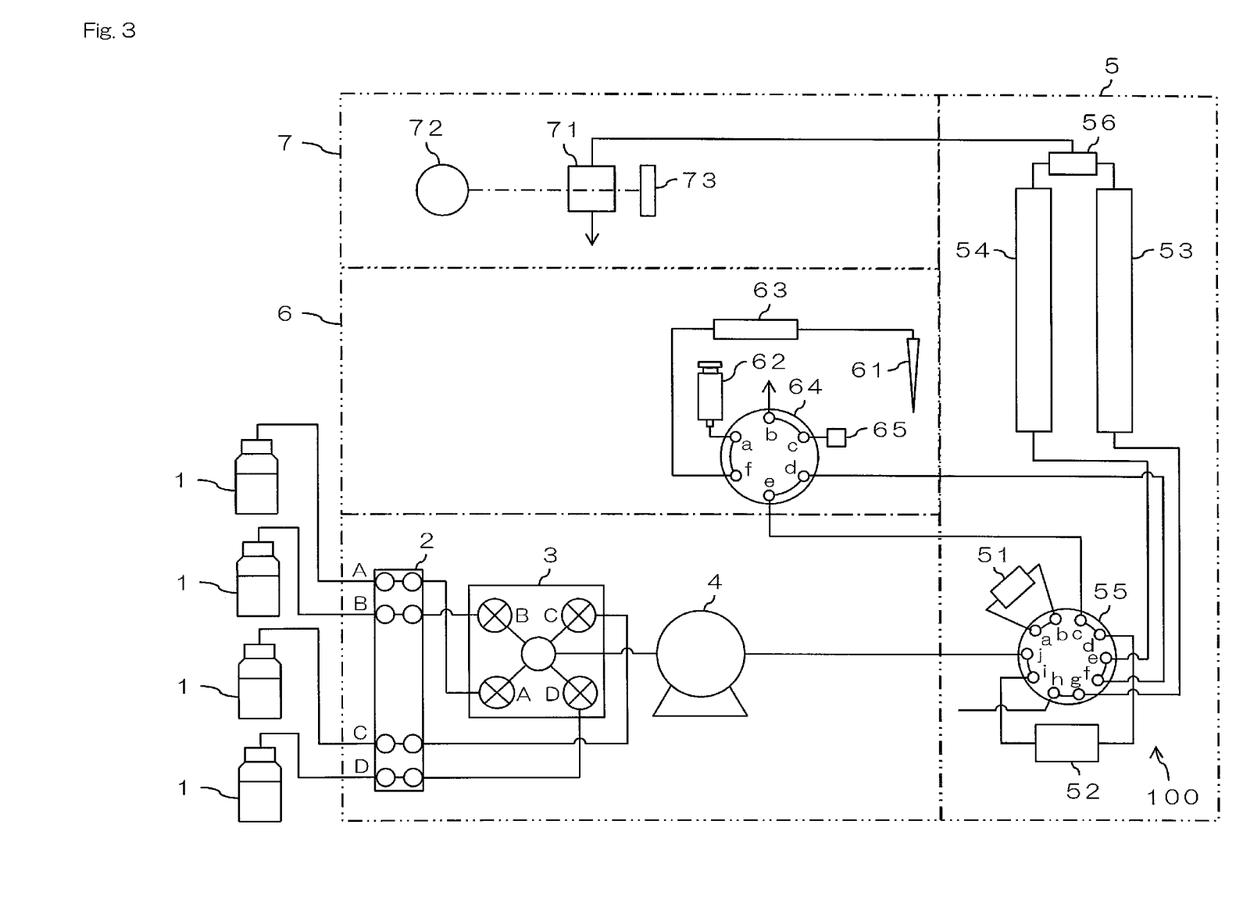
FIG. 3 is a flow channel diagram illustrating a state in which a first valve is rotated from the state in FIG. 1.

FIG. 3 is a flow channel diagram illustrating a state in which the first valve 55 is rotated from the state illustrated in FIG. 1. In the state illustrated in FIG. 3, the second valve 64 is in the state identical to the state illustrated in FIG. 1, and the ports a and f of the second valve 64 communicate with each other. Therefore, by driving the syringe 62 in this state and sucking the sample through the needle 61, it is possible to capture and concentrate the sample in the concentrator column 63.

In the state illustrated in FIG. 3, the ports c and d communicate with each other and the ports i and j communicate with each other in the first valve 55. Therefore, the plurality of kinds of solvents flowing into the port j of the first valve 55 from the liquid feed pump 4 is mixed in the second mixer 52, and then flows into the port e of the second valve 64. In the second valve 64, the ports d and e communicate with each other. Therefore, the plurality of kinds of solvents mixed in the second mixer 52 passes through the second valve 64 without flowing into the concentrator column 63, and flows into the port f of the first valve 55.

In the first valve 55, the ports e and f communicate with each other. Therefore, the plurality of kinds of mixed solvents is introduced into the second separation column 54. After passing through the second separation column 54, the plurality of kinds of mixed solvents flows into the cell 71 of the detector 7. As described, in the state illustrated in FIG. 3, the plurality of kinds of solvents mixed in the second mixer 52 is introduced into the second separation column 54 without the sample being introduced into the solvents. When the sample is analyzed by using the second mixer 52 and the second separation column 54, after the sample is captured in the concentrator column 63 in the above state, the needle 61 is inserted into the sample introduction unit 65, and the second valve 64 is rotated.

Figure 4:
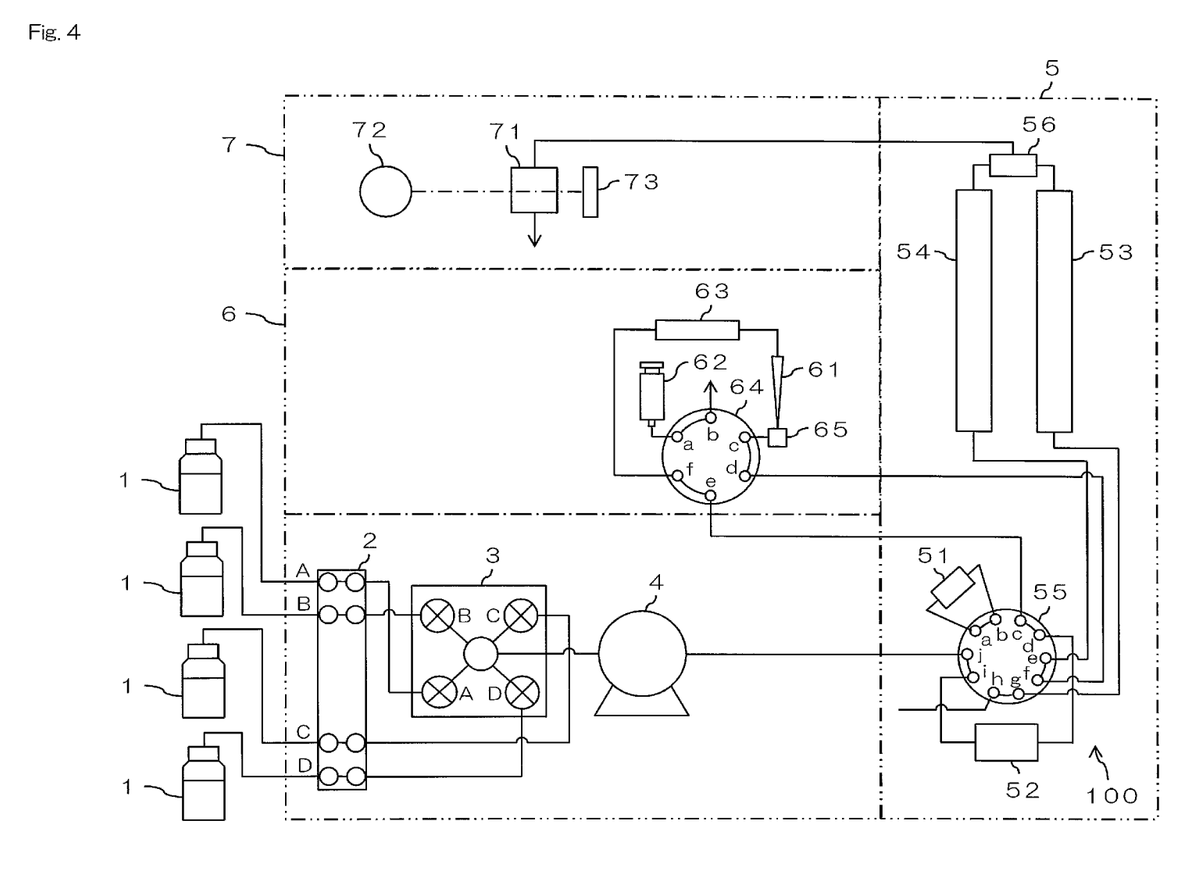
FIG. 4 is a flow channel diagram illustrating a state in which the second valve is rotated from the state in FIG. 3.

FIG. 4 is a flow channel diagram illustrating a state in which the second valve 64 is rotated from the state illustrated in FIG. 3. In the state illustrated in FIG. 4, the ports c and d communicate with each other and the ports e and f communicate with each other in the second valve 64. Therefore, unlike the case illustrated in FIG. 3, the plurality of kinds of solvents mixed in the second mixer 52 is not directly introduced into the second separation column 54 but passes through the concentrator column 63. After the concentrated sample is introduced into the concentrator column 63, the plurality of kinds of solvents is introduced into the second separation column 54.

Each sample component of the sample introduced into the second separation column 54 in this manner is separated while the sample passes through the second separation column 54. Then, each sample component is introduced into the cell 71 of the detector 7. Then, the light receiver 73 receives measuring light from the light source 72 that has passed through the cell 71. Thus, the peak of each separated sample component is detected according to the received light intensity. As described, the plurality of kinds of solvents mixed in the second mixer 52 is used as a mobile phase and the second separation column 54 is used to analyze the sample. Thus, conventional analysis can be performed.

As described above, in the present embodiment, by rotating the first valve 55, switchover between the first communication state (see FIGS. 1 and 2) and the second communication state (see FIGS. 3 and 4) is enabled. In the first communication state, the first mixer 51 and the first separation column 53 communicate with the detector 7. In the second communication state, the second mixer 52 and the second separation column 54 communicate with the detector 7. That is, the first valve 55 constitutes a flow-channel switching unit configured to enable switchover between the first communication state and the second communication state.

According to the present embodiment, only by rotating and switching the first valve 55, it is possible to easily switch between the first communication state and the second communication state. The internal capacity of the flow channel in the first communication state differs from that in the second communication state. Therefore, it is easy to perform analysis with different internal capacities.

In addition, according to the present embodiment, all of the first mixer 51, the second mixer 52, the first separation column 53, and the second separation column 54 are housed in the column oven 5. Therefore, since operations for replacing the mixers 51, 52 and operations for replacing the separation columns 53, 54 can be simultaneously performed, the operation is further facilitated.

In particular, in the present embodiment, since the flow-channel switching unit is configured of one valve (first valve 55), only by switching this one valve (first valve 55), it is possible to easily switch between the first communication state and the second communication state. The internal capacity of the flow channel in the first communication state differs from that in the second communication state. As a result, unlike the case of switching a plurality of valves, it is not necessary to synchronize switching timings, which further facilitates the operation.

Furthermore, in the present embodiment, it is possible to selectively introduce the sample captured and concentrated in the concentrator column 63 into the first separation column 53 or the second separation column 54 only by rotating and switching the first valve 55. Therefore, the concentrated sample is introduced into the first separation column 53 or the second separation column 54 by easily switching to the first communication state or the second communication state. The internal capacity of the flow channel in the first communication state differs from that in the second communication state. As a result, analysis can be performed satisfactorily by using one of the separation columns 53 and 54.

The first mixer 51, the second mixer 52, the first separation column 53, the second separation column 54, the first valve 55, the second valve 64, the concentrator column 63 and the like configure a flow channel mechanism 100 configured to separate the sample components in the solvents and enables the detector 7 to detect the sample components. In the present embodiment, the flow channel mechanism 100 described above is housed in the column oven 5. The detector 7 detects the sample components in the solvents having been separated in the first separation column 53 in the first communication state, or the sample components in the solvents having been separated in the second separation column 54 in the second communication state.

Note that the first valve 55 and the second valve 64 are automatically switched under control of a controller (not illustrated) including a CPU. However, the present invention is not limited to the above configuration. At least one of the first valve 55 and the second valve 64 may be manually switched.

In the above embodiment, a description has been given of the case where the flow-channel switching unit configured to enable switchover between the first communication state and the second communication state is configured of the first valve 55. However, the present invention is not limited to the above configuration. The flow-channel switching unit may be configured of a valve other than the 10-port valve, or may be configured of a plurality of valves. In addition, the flow-channel switching unit is not limited to a valve and may be configured of another member.

In a case where the flow-channel switching unit is configured of a plurality of valves, for example, a flow channel which communicates with the first mixer 51 and the first separation column 53 and a flow channel which communicates with the second mixer 52 and the second separation column 54 may be provided, and the flow-channel switching unit may be configured of a valve which selectively makes the upstream side of the flow channels communicate with the liquid feed pump 4 and a valve which selectively makes the downstream side of the flow channels communicate with the detector 7.

Configurations other than the flow channel mechanism is not limited to the configuration as in the above embodiment, and any other configuration may be adopted. For example, the present invention is not limited to the configuration in which low-pressure gradient analysis is performed by using one liquid feed pump 4. The present invention can also be applied to a configuration in which high-pressure gradient analysis is performed by using a plurality of liquid feed pumps.

What is claimed is:

1. A flow channel mechanism separating a sample component in a solvent and enabling a detector to detect the sample component, the flow channel mechanism comprising:
   a liquid feeding pump;
   a first mixer configured to receive, as an input, first mobile phase and second mobile phase, configured to mix the first mobile phase and the second mobile phase, and configured to output first mixed mobile phase therein;
   a second mixer which has a capacity different from a capacity of the first mixer and configured to receive, as an input, third mobile phase and fourth mobile phase, configured to mix the third mobile phase and the fourth mobile phase, and configured to output second mixed mobile phase therein;
   a first separation column which is associated with the first mixer;
   a second separation column which is associated with the second mixer;
   a flow-channel switching unit configured to switch between:
   a first communication state in which the first mixer and the first separation column communicate with the liquid feeding pump and in which, during communication between the first mixer, the first separation column, and the liquid feeding pump, the second mixer and the second separation column do not communicate with the liquid feeding pump, and
   a second communication state in which the second mixer and the second separation column communicate with the liquid feeding pump, and in which, during communication between the second mixer, the second separation column, and the liquid feeding pump, the first mixer and the first separation column do not communicate with the liquid feeding pump.

2. The flow channel mechanism according to claim 1 further comprising a column oven which houses the first mixer, the second mixer, the first separation column, and the second separation column, and an inside of which is heated.

3. The flow channel mechanism according to claim 1, wherein the flow-channel switching unit is configured of one valve.

4. The flow channel mechanism according to claim 1 further comprising a concentrator column configured to capture and concentrate a sample,
   wherein, in the first communication state, a sample concentrated in the concentrator column is introduced into the first separation column, and
   wherein in the second communication state, a sample concentrated in the concentrator column is introduced into the second separation column.

5. A liquid chromatograph comprising:
   the flow channel mechanism according to claim 1; and
   the detector configured to detect a sample component in a solvent having been separated in the first separation column in the first communication state, and a sample component in a solvent having been separated in the second separation column in the second communication state.

6. A flow channel mechanism separating a sample component in a solvent and enabling a detector to detect the sample component, the flow channel mechanism comprising:

a first mixer configured to mix solvents therein;

a second mixer which has a capacity different from a capacity of the first mixer and configured to mix solvents therein;

a first separation column which is associated with the first mixer;

a second separation column which is associated with the second mixer; and at least one flow-channel switching unit comprising a valve configured to enable switchover between a first communication state in which the first mixer and the first separation column communicate with the liquid feeding pump, and a second communication state in which the second mixer and the second separation column communicate with the liquid feeding pump;

wherein an inlet port of the first mixer is connected to a first port of the valve of the at least one flow-channel switching unit and an outlet port of the first mixer is connected to a second port of the valve of the at least one flow channel switching unit, and wherein an inlet port of the second mixer is connected to a third port of the valve of the at least one flow-channel switching unit and an outlet port of the second mixer is connected to a fourth port of the valve of the at least one flow channel switching unit.

7. A flow channel mechanism separating a sample component in a solvent and enabling a detector to detect the sample component, the flow channel mechanism comprising:

a liquid feeding pump;

a first mixer configured to receive, as an input, first mobile phase and second mobile phase, configured to mix the first mobile phase and the second mobile phase, and configured to output first mixed mobile phase therein;

a second mixer which has a capacity different from a capacity of the first mixer and configured to receive, as an input, third mobile phase and fourth mobile phase, configured to mix the third mobile phase and the fourth mobile phase, and configured to output second mixed mobile phase therein;

a first separation column which is associated with the first mixer;

a second separation column which is associated with the second mixer;

an autosampler which includes a needle, a sample loop, and a second valve; and a flow-channel switching unit configured to switch between:

a first communication state in which the first mixer and the first separation column communicate with the liquid feeding pump and the second mixer and the second separation column do not communicate with the liquid feeding pump, and a second communication state in which the second mixer and the second separation column communicate with the liquid feeding pump and the first mixer and the first separation column do not communicate with the liquid feeding pump;

wherein each of the first mixer and the second mixer are disposed upstream of the autosampler.

* * * * *